United States Patent
Stadlmair et al.

(10) Patent No.: US 12,132,816 B2
(45) Date of Patent: Oct. 29, 2024

(54) METHOD AND INTEGRATED CIRCUIT FOR CLOCK RECOVERY IN AN RFID TAG

(71) Applicant: NXP B.V., Eindhoven (NL)

(72) Inventors: Rainer Stadlmair, Deutschfeistritz (AT); Shankar Joshi, Bangalore (IN); Raghavendra Kongari, Bangalore (IN)

(73) Assignee: NXP B.V., Eindhoven (NL)

( * ) Notice: Subject to any disclaimer, the term of this patent is extended or adjusted under 35 U.S.C. 154(b) by 121 days.

(21) Appl. No.: 18/149,713

(22) Filed: Jan. 4, 2023

(65) Prior Publication Data
US 2024/0113855 A1    Apr. 4, 2024

(30) Foreign Application Priority Data
Sep. 30, 2022   (IN) .............................. 202221056463

(51) Int. Cl.
| | |
|---|---|
| *H04L 7/033* | (2006.01) |
| *G06K 19/07* | (2006.01) |
| *H04L 7/00* | (2006.01) |

(52) U.S. Cl.
CPC ........ *H04L 7/0337* (2013.01); *G06K 19/0723* (2013.01); *H04L 7/0037* (2013.01)

(58) Field of Classification Search
CPC .. H04L 7/0037; H04L 7/0337; G06K 19/0723
See application file for complete search history.

(56) References Cited

U.S. PATENT DOCUMENTS

| | | | |
|---|---|---|---|
| 9,124,413 B2 | 9/2015 | Savoj | |
| 2007/0205871 A1 | 9/2007 | Posamentier | |
| 2017/0030853 A1* | 2/2017 | Hodges, Jr. | ............ G06Q 10/06 |
| 2019/0173528 A1* | 6/2019 | Keehr | ...................... H04B 1/38 |
| 2021/0111758 A1 | 4/2021 | Pichler et al. | |

OTHER PUBLICATIONS

Cantalice, Rafael et al.; "Low Power, High-Sensitivity Clock Recovery Circuit for LF/HF RFID Applications"; SBCCI 2015 28th Symposium on Integrated Circuits and Systems Design; Aug. 31-Sep. 4, 2015, Salvador, Brazil; DOI: 10.1145/2800986.2801015.

Chen, Shih-En et al.; "Reference-less Wake-up Receiver with Noise Suppression and Injection-Locked Clock Recovery"; The Institution of Engineering and Technology Journal; IET Circuits, Devices & Systems; Received May 16, 2019; e-Published Jan. 31, 2020; DOI: 10.1049/iet-cds.2019.0195.

* cited by examiner

*Primary Examiner* — David S Huang

(57) ABSTRACT

There is provided, a method for clock recovery in a RFID tag, the method includes receiving a RF field from a RFID reader. A field clock is generated from the received RF field, from which a clock recovery signal is generated. The RF field is modulated to produce a RF modulation. Generation of the clock recovery signal is paused while the RF field is being modulated. A modulation envelope signal is generated and used for load modulation. Generation of the clock recovery signal at the end of the RF modulation is resumed after a delay of one clock cycle from a falling edge of the modulation envelope signal. In another embodiment of the method, instead of adding the delay, a differential amplifier is used to increase RF field detection sensitivity. The method and the RFID tag ensures synchronized resumption of a PLL clock and the clock recovery signal.

20 Claims, 10 Drawing Sheets

METHOD AND INTEGRATED CIRCUIT FOR CLOCK RECOVERY IN AN RFID TAG

BACKGROUND

Field

This disclosure relates generally to electronic circuits, and more particularly, to a method and integrated circuit (IC) for clock recovery in an RFID tag.

Related Art

Radio frequency (RF) communication devices such as radio-frequency identification (RFID) tags, are widely used to identify an object to which the tag is attached. The most common application examples of the RFID tags are retail, supply chain management, shipping services, airline luggage tracking, laundry services, etc. RFID tags and a RFID reader form an RFID system. The standard communication between a reader and a tag, and vice versa, are specified in protocols. Typically, a RFID tag uses load modulation to transmit responses to requests from a RFID reader. RFID tags are expected to communicate with the reader throughout their operating range. If there is a communication failure in the middle of the operating distance (communication hole), the effective operating distance is shorter than the possible distance promised by its operating range. FIG. 1 illustrates an example RFID tag operation over RFID reader receiver gain percentage with a communication hole. Area 11 in FIG. 1 illustrates a field strength range where communication between a RFID tag and a reader is good. Area 12 shows a field strength range where all communication has failed. Area 13 shows an a narrow band of field strength range beyond area 12 where communication is good again. Area 14 shows that the RFID tag is out of range. The communication failure at area 12 could occur if a bit grid of transmission and reception is not synchronous between a RFID reader and a RFID tag. In order to have a synchronous timing with the reader, an RFID tag first needs to recover the field clock. The clock frequency of the field clock determines the operating speed and power consumption of an RFID tag. For near field communication (NFC), the frequency is 13.56 MHz. To reduce power consumption, RFID tags could operate with a system clock lower than the field frequency (e.g., half of the field clock), which also improves the operating distance. Clock recovery is used to generate an internal clock for the RFID tag from the received field clock from the RFID reader. If a slower internal clock is used, clock recovery needs to stay in phase with the field clock during reception and transmission when the field clock cannot be used for clock recovery.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

Figure 1:
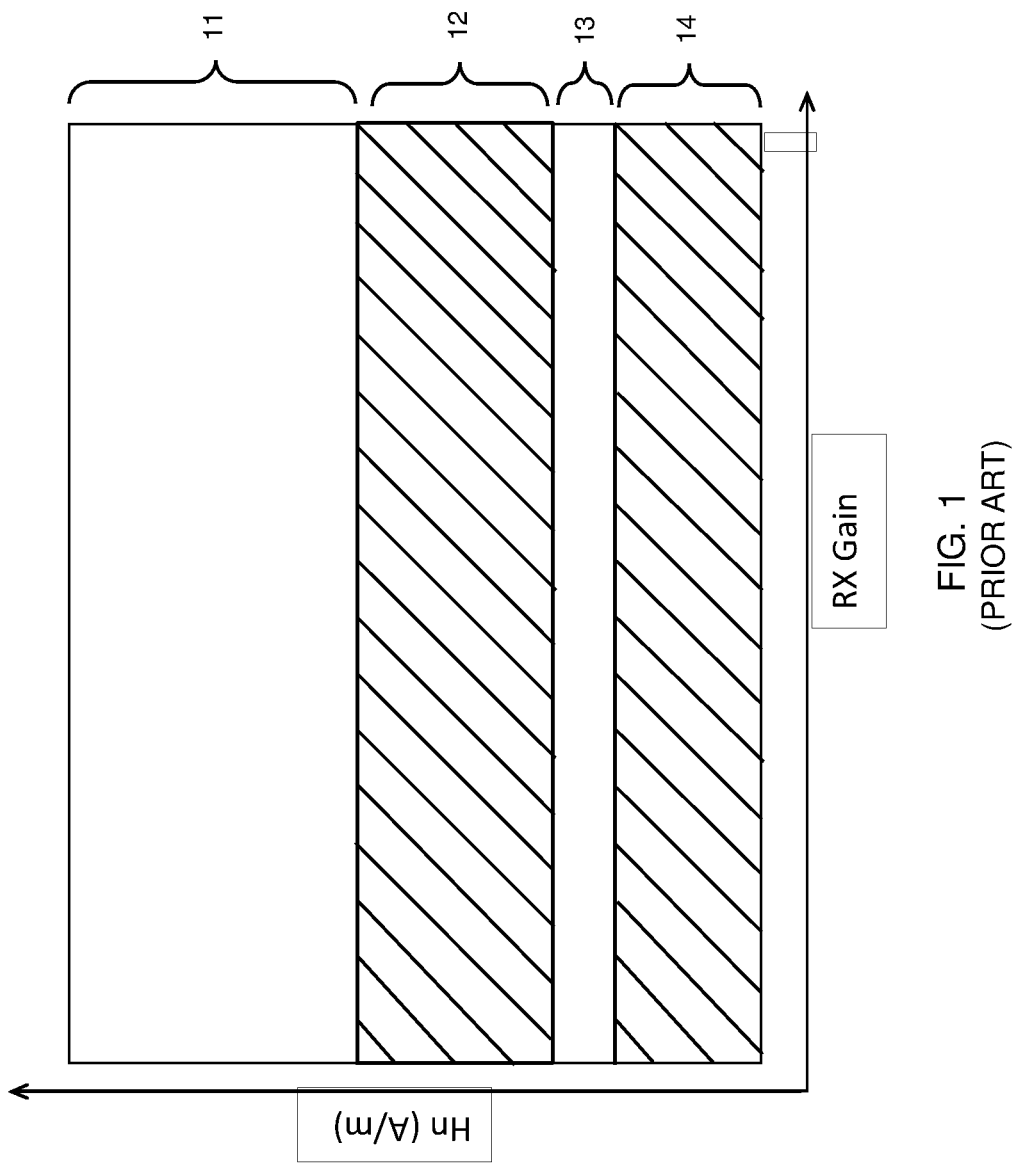
FIG. 1 illustrates RFID tag operation over reader receiver gain percentage with a communication hole.

Generally, there is provided, a clock recovery operation for a RFID tag. The clock recovery operation provides a clock recovery signal that acts as a reference clock for a phase-locked loop (PLL) clock, that in turn synchronizes its output to the clock recovery signal. A clock recovery signal is generated from a magnetic field transmitted by a RFID reader. A phase-locked loop (PLL) clock is maintained in sync with the clock recovery signal. During transmission by the RFID tag to the reader, the clock recovery signal is paused. The PLL clock is now free-running, and the RFID tag continues to operate using the PLL clock. When the transmission pauses, a clock recovery generator in the RFID tag detects and recovers the field clock to again generate the clock recovery signal. The clock recovery generator ensures recovery of a clock frequency of a RF field clock. The PLL clock will synchronize onto the RF field clock after the PLL clock is released from free running mode and the clock recovery is activated. The PLL clock only synchronizes with the clock recovery signal when the clock recovery generator is active. According to an embodiment, the clock recovery generator uses one of a differential amplifier or an inverter to provide the clock recovery signal. A delay circuit is also included. The differential amplifier has increased sensitivity and can detect the field clock at a lower amplitude than an inverter. When selected, the increased sensitivity of the differential amplifier allows the first rising edge of the field clock to be detected, and the clock recovery signal remains in sync with the field clock. When selected, the inverter uses the delay provided by the delay circuit to provide a delay sufficient to delay clock recovery one clock cycle after a falling edge of a modulation envelope signal. The modulation envelop signal is used to begin and end the transmission with rising and falling edges, respectively. The one clock cycle delay ensures the RF field clock can recover to a sufficiently high level so that the inverter can reliably recover the RF field clock. The reliable recovery on the correct RF field edge also ensures that the clock recovery wakes up synchronously to the PLL clock. An additional delay may be added to the one clock cycle delay to help the PLL clock and clock recovery signal to synchronize more quickly. Maintaining the PLL clock and the clock recovery signal in synchronization helps to ensure reliable communication through the operating range and prevent a communication hole from occurring. Additional details will be provided in the following description.

In accordance with an embodiment, there is provided, a method for clock recovery in a radio frequency identification (RFID) tag, the method including: receiving a radio frequency (RF) field from a RFID reader; generating a field clock from the received RF field, wherein the RFID tag generates a clock recovery signal from the field clock; modulating the RF field to produce a RF modulation and pausing generation of the clock recovery signal while the RF field is being modulated; generating a modulation envelope signal and using the modulation envelope signal for load modulation; and resuming generation of the clock recovery signal at the end of the RF modulation after a first delay of one clock cycle of the clock recovery signal in response to a falling edge of the modulation envelope signal. The method may further include generating a phase locked loop (PLL) clock to operate the RFID tag while the load modulation is being produced. The PLL is free running during the load modulation. The method may further include operating a phase locked loop (PLL) in synchronization with the clock recovery signal, wherein the PLL and the clock recovery signal are at one-half a frequency of the field clock. The method may further include providing an inverter circuit having an input coupled to a first antenna terminal, and an output coupled to provide the clock recovery signal. Resuming generation of the clock recovery signal at the end of the RF modulation after the first delay of one clock cycle of the clock recovery signal from a falling edge of the modulation envelope signal may further include delaying enablement of the inverter by a second delay in addition to the first delay. The method may further include: providing a differential amplifier circuit having a first input coupled to the first antenna terminal, a second input coupled to a second antenna terminal, and an output; and coupling the output of the differential amplifier circuit to a first input of a multiplexer, coupling the output of the inverter circuit to a second terminal of the multiplexer, wherein in response receiving to a selection signal, an output of the multiplexer providing the clock recovery signal using one of the differential amplifier circuit and the inverter circuit. Resuming generation of the clock recovery signal at the end of the RF modulation after a first delay of one clock cycle of the clock recovery signal from a falling edge of the modulation envelope signal may further include adding a second delay to the resuming generating of the clock recovery signal. Adding the second delay may further include adding one or more gate delays.

In another embodiment, there is provided, an integrated circuit (IC) including: a modulation envelope generator for receiving a phase-locked loop (PLL) clock and for generating a modulation envelope signal for load modulation; a clock recovery generator, including: a differential amplifier circuit having first and second inputs coupled to first and second antenna terminals, and an output; an inverter circuit having an input coupled to one of the first and second antenna terminals, and an output; a multiplexer having a first input coupled to the output of the differential amplifier, a second input coupled to the output of the inverter circuit, and an output coupled to provide a clock recovery signal generated using one of the differential amplifier circuit and the inverter circuit in response to a selection signal; and a clock recovery enable circuit coupled to receive the PLL clock and the modulation envelope signal, and an output coupled to provide delay enablement of the inverter circuit one clock cycle after resumption of a radio frequency (RF) field clock after the load modulation. The IC may further include a memory for storing configuration settings for a radio frequency identification (RFID) tag. The modulation envelope generator may control a beginning and an ending of a load modulation period of the RFID tag. The delay circuit may further include one of more gates for providing an additional delay to the enablement of the inverter circuit. The inverter circuit may further include a divide by two circuit coupled to the output of the inverter circuit, and the differential amplifier circuit may further include a divide by two circuit coupled to the output of the differential amplifier. The IC may further include a phase locked loop (PLL) coupled to provide a clock signal when the clock recovery signal is not available during the load modulation.

In yet another embodiment, there is provided a method for clock recovery in a radio frequency identification (RFID) tag, the method including: receiving a radio frequency (RF) field from a RFID reader; generating a field clock from the received RF field, wherein a first clock recovery signal is generated from the field clock using a differential amplifier circuit; modulating the RF field to produce an RF modulation, wherein the first clock recovery signal is paused while the RF field is being modulated; generating a modulation envelope signal and load modulating the RF field using the modulation envelope signal; detecting, using the differential amplifier circuit, a resumption of the RF field after the load modulation; and resuming generation of the first clock recovery signal in response to the differential amplifier circuit detecting the RF field. The method may further include generating a phase locked loop (PLL) clock to operate the RFID tag while the RF field is being load modulated. The method may further include: providing an inverter circuit having an input coupled to a first antenna terminal, and an output for providing a second clock recovery signal; and selecting one of the first clock recovery signal or the first clock recovery signal to operate the RFID tag. The inverter circuit may be coupled to a delay circuit, wherein the delay circuit is enabled in response to a falling edge of the modulation envelope signal. The method may be performed in an integrated circuit of the RFID tag.

Figure 2:
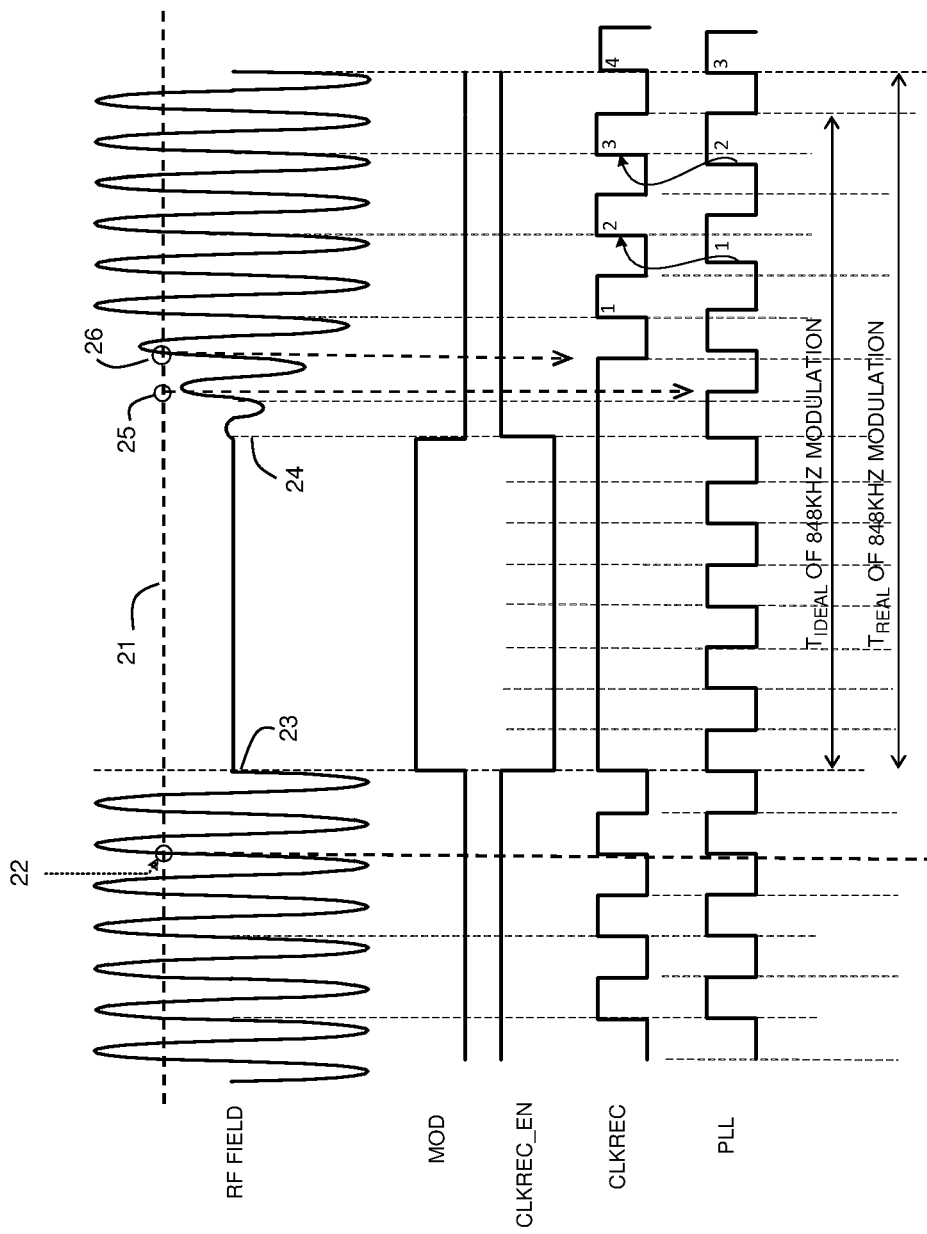
FIG. 2 illustrates a timing diagram of various signals of a clock recovery operation following a pause in transmission where the PLL clock is shifted approximately 180 degrees to a clock recovery signal after modulation and before synchronization of PLL clock.

FIG. 2 illustrates a timing diagram of various signals in a clock recovery operation following a pause in transmission where the PLL clock is shifted approximately 180 degrees to a clock recovery signal after the modulation pause. During clock recovery of a RFID tag, an inverter coupled to the antenna functions as a detector and establishes a threshold voltage 21 for detecting a field clock labeled "RF FIELD" from a RFID reader via an antenna. In an NFC application, field clock RF FIELD is at 13.56 MHZ. In FIG. 2, a reference 22 shows a point where field clock RF FIELD is detected when threshold voltage 21 is reached by RF FIELD. An RFID tag may operate at a frequency lower than field clock RF FIELD. A clock signal referred to as a clock recovery signal is generated from field clock RF FIELD. In FIG. 2, the clock recovery signal is labeled "CLKREC", and as can be seen, clock recovery signal CLKREC is at one-half the frequency of field clock RF FIELD. The PLL clock is used to operate the RF tag. The PLL clock is synchronized with the clock recovery signal CLKREC when the RF FIELD is present and will be switched to a free-running mode when the RF FIELD is not present. For correct communication of information from the RFID tag to the RFID reader, clock recovery signal CLKREC must be maintained in phase with the field clock. Also, an integrated circuit in the RFID tag operates using the PLL clock which is synchronized to the clock recovery signal CLKREC for timing. A problem may occur when the RFID tag is transmitting or receiving information from the reader. The field clock RF FIELD is lost while the communication is occurring because field clock RF FIELD is used to generate a message using load modulation. However, the alignment of clock recovery signal CLKREC must be maintained in phase with field clock RF FIELD, even when field clock RF FIELD is present. For example, during a transmission of a response by the RF tag, the field clock is not present as shown between times 23 and 24 in FIG. 2. The beginning and ending of the transmission are controlled by a modulation envelope signal labeled "MOD". A clock recovery enable signal labeled "CLKREC_EN" in FIG. 2 is essentially the inverse of modulation envelope signal MOD and will be discussed later. During times when the field clock is not present, a phase-locked loop (PLL) clock labeled "PLL" is used to maintain timing for the RFID tag. The PLL synchronizes on clock recovery signal CLKREC when RF FIELD starts to recover and CLKREC_EN is enabled after time 24. Between times 23 and 24, clock PLL is free running and may drift with respect to clock RF FIELD. A clock recovery operation begins in response to a rising edge of signal CLKREC_EN at time 24.

During the clock recovery operation, clock recovery signal CLKREC will begin to be recovered once an amplitude of field clock RF FIELD is at least as high as threshold voltage level 21 as shown, e.g., where the RF FIELD crosses reference point 22. For small antennas (e.g., class 6 antennas) and low field strengths, the RF FIELD amplitude may not recover fast enough, so that even multiples of RF FIELD amplitudes are missed as shown at reference 25, which may cause the clock recovery of clock CLKREC to start at odd multiples of the recovered field clock RF FIELD as shown at reference 26 along the threshold voltage line 21. This results in approximately 180-degree shift of clock recovery signal CLKREC as compared to before clock RF FIELD was paused between times 23 and 24. Also, clock PLL is now around 180 degrees shifted with respect to clock recovery clock CLKREC as illustrated by the corresponding clock edges of clock recovery signal CLKREC and clock PLL where each rising clock edge is numbered 1-4. As can be seen, clock edge 1 of clock recovery signal CLKREC lags clock edge 1 of clock PLL by about one-half period. This results in clock PLL slowing down to get in sync with the rising edge of the clock recovery clock again. This will take a few clock cycles as can be seen by subsequent clock edges numbered 2, 3, and 4, until the rising edges of clock PLL and clock recovery signal CLKREC are in sync with each other again. However, the slowing down of clock PLL during synchronization may result in half a clock cycle being lost as shown by time periods $T_{IDEAL}$ and $T_{REAL}$ between time 23 and clock edge 3 of PLL clock PLL. If this happens multiple times, such as for longer responses, the PLL clock may drift further, and may shift by multiple clock periods, resulting in communication failure (e.g., bitrate mismatch due to expansion of response).

Figure 3:
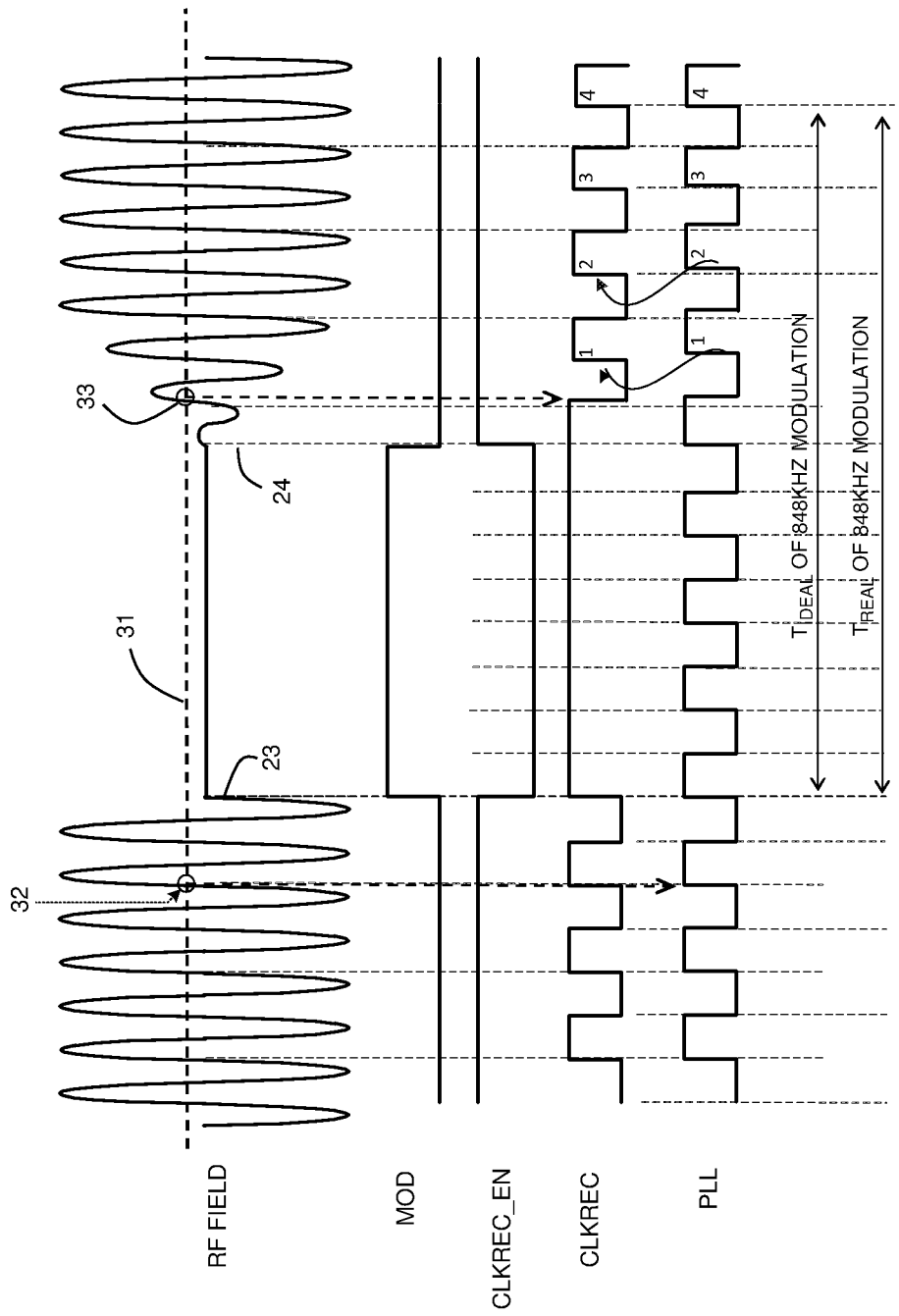
FIG. 3 illustrates a timing diagram of various signals of a clock recovery operation following a pause in transmission where the PLL clock and the clock recovery signal are synchronized in accordance with an embodiment.
Figure 5:
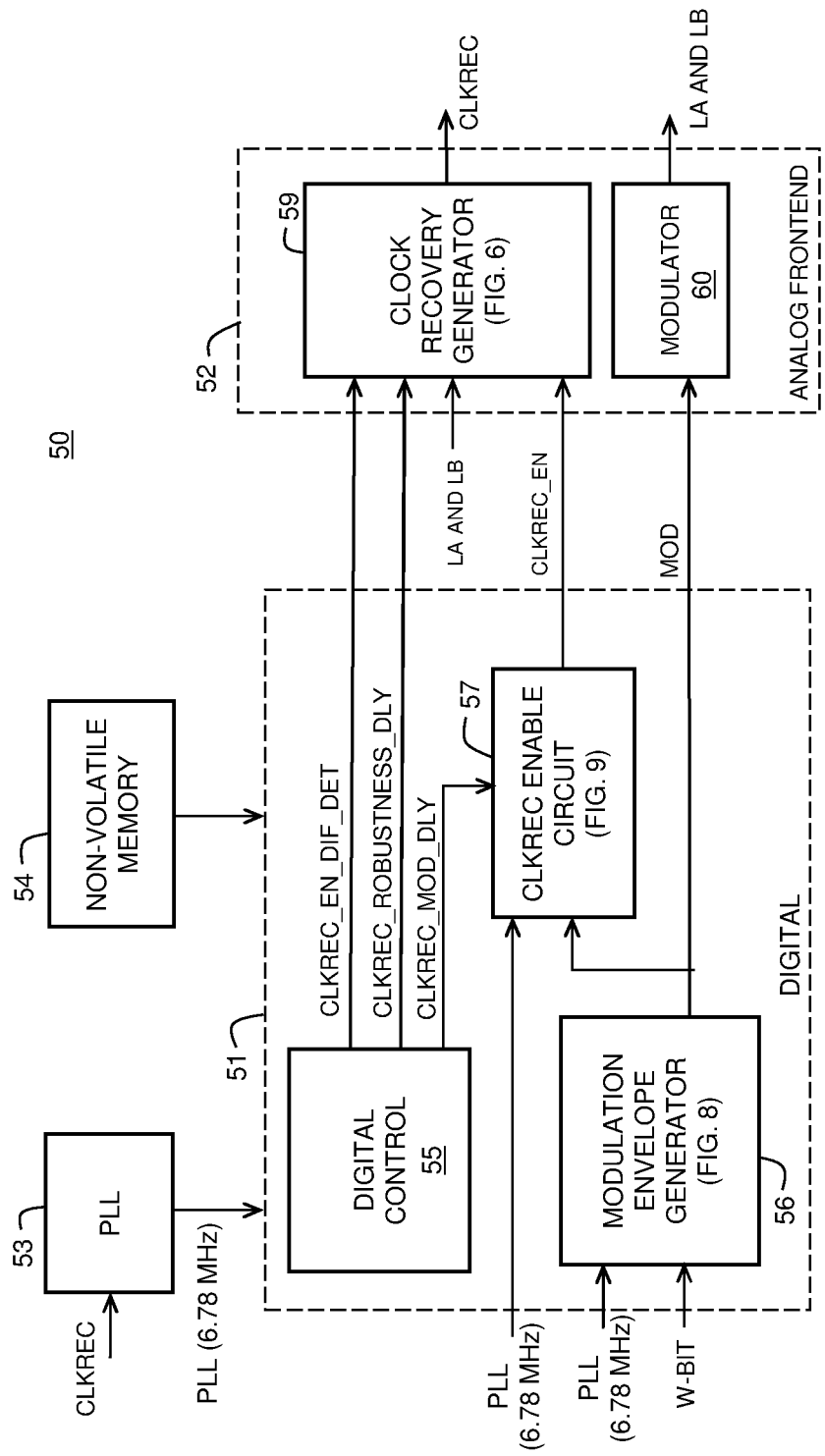
FIG. 5 illustrates a RFID tag in accordance with an embodiment.
Figure 6:
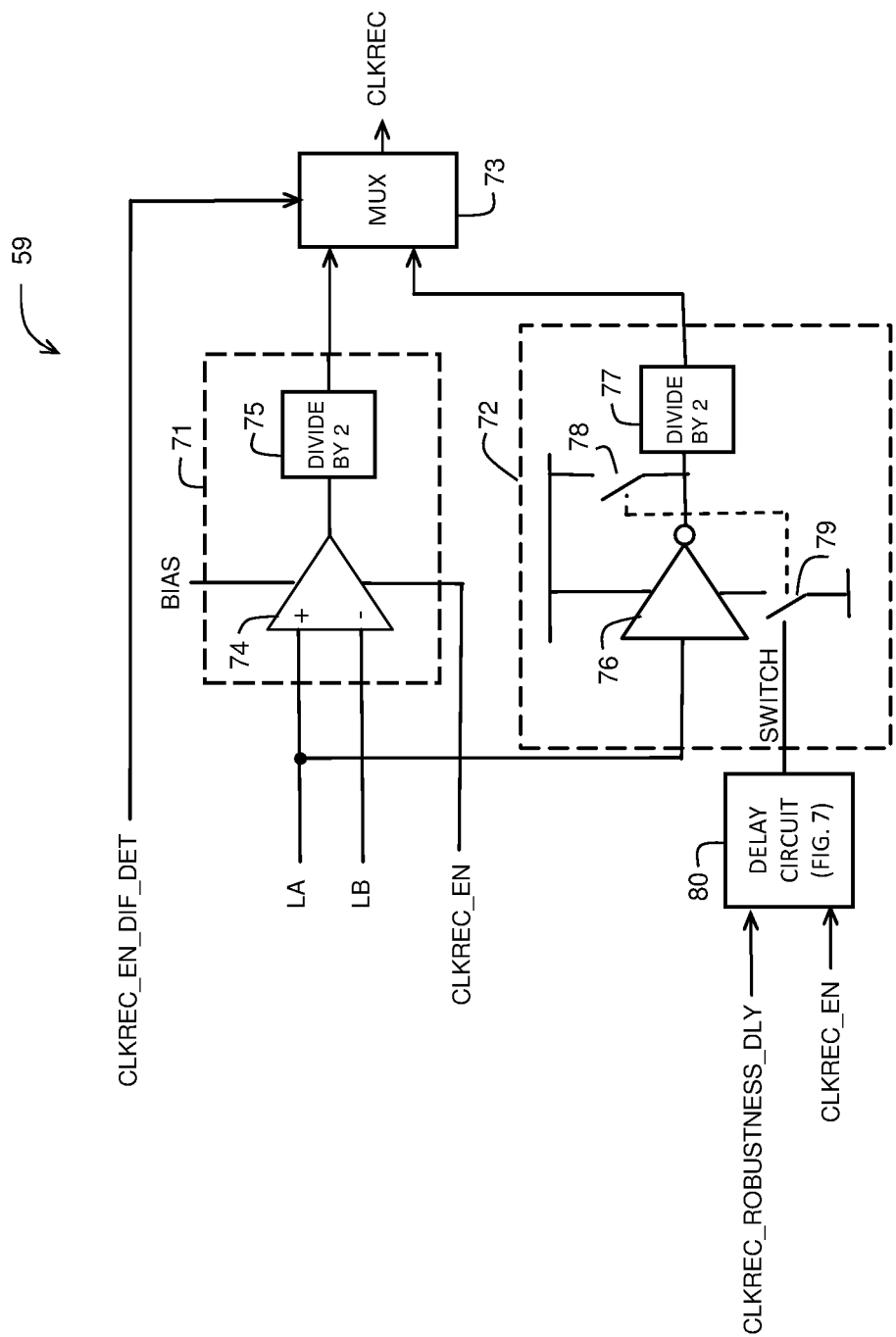
FIG. 6 illustrates the clock recovery generator of the RFID tag of FIG. 5 in more detail.

FIG. 3 illustrates a timing diagram of various signals of a clock recovery operation following a pause in transmission where clock PLL and clock recovery signal CLKREC are synchronized according to an embodiment. FIG. 5 illustrates an example RFID tag that corresponds to the signals illustrated in FIG. 3. In an NFC application, field clock RF FIELD is at 13.56 MHZ. In another embodiment, field clock RF FIELD may be a different frequency. Clock recovery signal CLKREC is generated by clock recovery generator 59 (FIG. 5) at one-half the frequency of field clock RF FIELD, which is 6.78 MHZ for NFC. To improve synchronization, a detection sensitivity of field clock RF FIELD is increased to provide a lower threshold voltage 31 than threshold voltage 21 as shown in FIG. 2. In one embodiment, to achieve the lower threshold voltage 31, the sensitivity of the clock recovery is increased by using a differential amplifier instead of the inverter as described above regarding FIG. 2. An example embodiment of a clock recovery circuit 59 using a differential amplifier circuit 71 is shown in FIG. 6. The differential amplifier is used to sense a difference between positive and negative antenna inputs, labeled LA and LB in FIG. 5, to detect when a zero-crossing as shown by reference number 32 occurs. Due to the increased sensitivity, very small amplitudes of field clock RF FIELD can be recovered, so that the first even antenna voltage can be recovered as shown at reference point 33, which restarts clock recovery signal CLKREC. Even with smaller antennas and lower field strength this increased sensitivity should be sufficient for the differential amplifier to recover the first even edge of field clock RF FIELD reliably.

Since clock recovery signal CLKREC will now restart in sync with the clock PLL as shown at the rising edge of clock PLL labeled 1, the PLL clock only needs to compensate for the minor shift during a free running time as shown at rising edges 1-4 of clock PLL and clock recovery signal CLKREC. Increasing detection sensitivity and thus lowering the detection threshold voltage 31 ensures that no clock edge will be lost and the PLL and clock recovery signal CLKREC stays in sync as illustrated in FIG. 3 by time periods $T_{IDEAL}$ and $T_{REAL}$ being equal. Therefore, the embodiment of FIG. 3 will not show a drift in the response timing to a command from a RFID reader and clock PLL has 1 more clock period to lock after slightly drifting.

Figure 4:
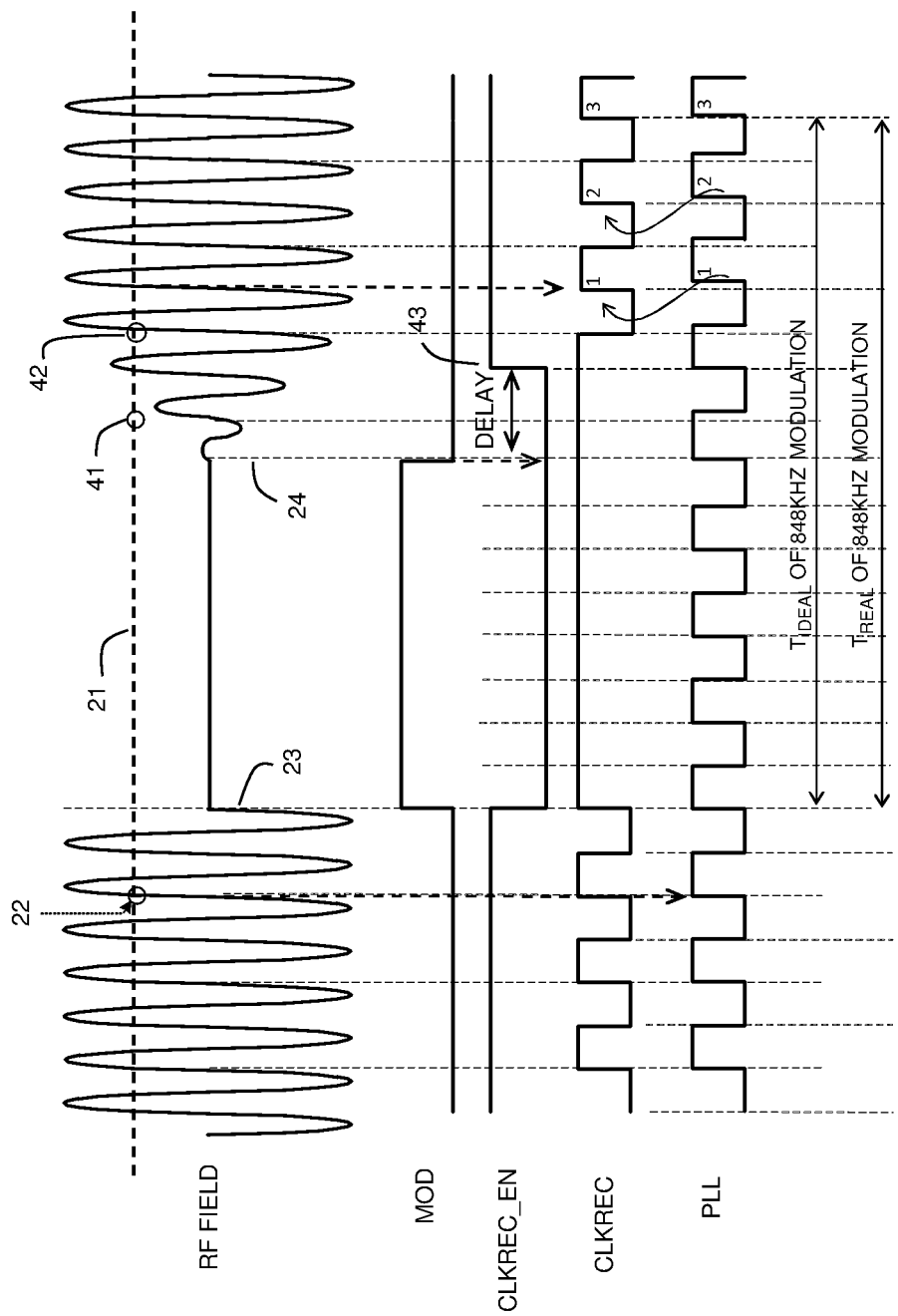
FIG. 4 illustrates a timing diagram of various signals of a clock recovery operation following a pause in transmission where the PLL and the clock recovery signal are synchronized in accordance with another embodiment.

FIG. 4 illustrates a timing diagram of various signals of a clock recovery operation of an RFID tag following a pause in transmission where clock PLL and clock recovery signal CLKREC are synchronized in accordance with another embodiment. FIG. 5 illustrates an example RFID tag that corresponds to the signals illustrated in FIG. 4. The time period between times 23 and 24 is when field clock RF FIELD is not being provided for clock recovery. A clock recovery operation begins in response to a rising edge of clock recovery signal CLKREC_EN. In the illustrated example, clock recovery generator 59 includes an inverter circuit 72 that can function as a detector when selected. The inverter has a threshold voltage 21 marked as a dashed line in FIG. 4. The first rising edge of field clock RF FIELD at reference point 41 is not detected by the inverter used for amplitude detection because the amplitude of field clock RF FIELD is too low to trip the inverter. The second rising edge, which is above voltage threshold line 21 of the inverter, must not be detected, to ensure clock recovery signal CLKREC does not wake up 180 degrees shifted with respect to clock PLL. The next rising edge at reference point 42 is the first edge that is detected. The described embodiment solves the problem of clock synchronization by delaying enablement of clock recovery by one 6.78 MHz clock cycle (one-half of 13.56 MHz) from a falling edge of modulation envelope signal MOD as shown by the rising edge of clock recovery enable signal CLKREC_EN at time 43. Typically, clock recovery enable signal CLKREC_EN is essentially the inverse of modulation envelope signal MOD, and is used to trigger clock recovery. However, in the described embodiment, the rising edge of clock recovery signal CLKREC_EN is delayed, or stretched, so that the rising edge occurs about one clock cycle later than the falling edge of modulation envelope signal MOD. The one clock cycle delay is equal to about one clock cycle of the clock recovery signal CLKREC. This delay will ensure that the first three clock cycles of a 13.56 MHz field clock RF FIELD will be skipped and only the 4$^{th}$ cycle (even) will be the first one detected (as shown at reference point 42) by the clock recovery operation. Modulation envelope signal MOD has a 50 percent duty cycle and is routed to a load modulator inside an analog frontend of a RFID tag to perform load modulation during transmission (see FIG. 5). Even with smaller antennas and lower field strength the delay of one clock cycle should be sufficient for the antenna voltage to recover over at least a threshold voltage of the inverter, so that the inverter-based clock recovery can reliably detect this edge.

Because the clock recovery signal CLKREC should wake up in sync with clock PLL, clock PLL only needs to compensate for the minor shift which occurred during the free running time between times 23 and 24 as shown in FIG. 4 when signal CLKREC_EN was low (this may only be a few nanoseconds). Delay circuit 80 includes additional delay for signal CLKREC_EN as described below and shown in FIG. 7. It delays the enabling of the inverter-based clock recovery by a few nanoseconds and according to one embodiment, is used with inverter-based clock recovery when selected by configuration signal CLKREC_ROBUSTNESS_DLY from digital control 55 in FIG. 5.

Clock recovery signal CLKREC_EN is in sync with clock PLL after applying the one clock cycle delay, however clock PLL loses its synchronization with field clock RF FIELD because of drift. A PLL clock can drift up to 10 degrees when operating in free running mode which occurs when clock recovery signal CLKREC_EN is low. Hence, additional delay is introduced by the delay circuit. When clock PLL and the field clock RF FIELD are not perfectly in sync, the delay time of signal CLKREC_EN may not be sufficient over all process and temperature corners. This additional delay will ensure that the clock recovery operation will begin correctly under all circumstances and thus increases the robustness of the embodiment of FIG. 4. Note there are no lost clock cycles as shown by time periods $T_{IDEAL}$ and $T_{REAL}$ being substantially equal.

FIG. 5 illustrates RFID tag 50 in accordance with an embodiment. The embodiment illustrated in FIG. 5 is a simplified view and focusses on the circuits used for clock recovery as illustrated above in the timing diagrams of FIG. 3 and FIG. 4. RFID tag 50 includes digital circuit 51, analog frontend 52, PLL 53, and non-volatile memory (NVM) 54. Phase-locked loop 53 receives clock recovery signal CLKREC as a reference clock. Clock signal CLKREC is provided at 6.78 MHz, which is one-half the frequency of field clock RF FIELD. PLL 53 provides a PLL clock labeled PLL at the same frequency as clock signal CLKREC. Digital circuit 51 includes digital control circuit 55, modulation envelope generator 56, and clock recovery enable circuit 57. Analog frontend 52 includes clock recovery generator 59 and modulator 60. RFID tag 50, as illustrated in FIG. 5 can be implemented in one or more integrated circuits. Digital control 55 processes both the demodulated data and the protocol commands and handles communication with the memory. Configuration elements used by digital control circuit 55 for configuring the clock recovery signal CLKREC are stored in NVM 54. The CLKREC configuration elements are read from NVM 54 during bootup of RFID tag 50 and written to registers (not shown) in digital control 55. Digital control circuit 55 provides control signal CLKREC_EN_DIF_DET to clock recovery generator 59 for controlling whether clock recovery generator uses a differential amplifier circuit or an inverter circuit as a detector for detecting the field clock RF FIELD (see FIG. 6). The differential amplifier circuit has higher sensitivity compared to the inverter circuit as can be seen by a comparison of thresholds 21 and 31 in FIG. 2 and FIG. 3, respectively. Clock recovery generator 59 has two antenna terminals labelled LA and LB for connection to an antenna. The antenna can be any appropriate antenna type such as a dipole or loop antenna. The loop antenna may have one or more loops. In one embodiment, the antenna may be a small antenna class such as a class 6. Clock recovery generator 59 is shown in more detail in FIG. 6. Digital control circuit 55 provides control signal CLKREC_MOD_DLY to control operation of clock recovery enable circuit 57. Clock recovery enable circuit 57 is shown below in more detail in FIG. 9. Modulation envelope generator 56 receives clock PLL and a bit labelled W_BIT. The W-bit is provided to mark the start of frame (SOF), data bits, and end of frame (EOF) of a transmitted frame. Modulation envelope generator 56 provides modulation envelope signal MOD to control the beginning of clock recovery as shown FIG. 3 and FIG. 4. In one embodiment, modulation envelope signal MOD is generated as per International Organization for Standardization (ISO) protocol requirement ISO/IEC 14443. An embodiment of modulation envelope generator 56 is shown in more detail in FIG. 8. Modulation envelope signal MOD is provided to modulation circuit 60 for load modulation, which occurs, as illustrated in FIG. 3 and FIG. 4, between times 23 and 24. Clock recovery generator 59 receives clock recovery enable signal CLKREC_EN from clock recovery enable circuit 57 based on control signal CLKREC_MOD_DLY from digital control 55. Clock signal CLKREC_EN is essentially an inverted version of modulation envelope signal MOD with its pulse width increased by about one clock cycle of clock PLL.

FIG. 6 illustrates clock recovery generator 59 of the RFID tag of FIG. 5 in more detail. Clock recovery generator 59 includes differential amplifier circuit 71, inverter circuit 72, and multiplexer 73. Differential amplifier circuit 71 includes differential amplifier 74 and divide-by-2 circuit 75. Inverter circuit 72 includes inverter 76, divide-by-2 circuit 77, and switches 78 and 79. Both differential amplifier circuit 71 and inverter circuit 72 are disabled during transmission (between times 23 and 24 in FIG. 3 and FIG. 4) and clock recovery enable signal CLKREC_EN is low. Switches 78 and 79 are controlled by enable signal CLKREC_EN. Switch 78 is closed and switch 79 is open when enable signal CLKREC_EN is low, disabling inverter circuit 71 by causing the output of inverter 76 to be pulled to the power supply voltage, while switch 79 disables inverter 76 by disconnecting it from ground.

An antenna (not shown) is coupled to antenna terminals LA and LB. The antenna can be any appropriate antenna type such as a dipole or loop antenna. The loop antenna may have one or more loops. In one embodiment, the antenna may be a small antenna class such as class 6. The antenna receives field clock RF FIELD from an RFID reader (not shown). Differential amplifier 74 has a positive input (+) and a negative input (−) coupled to antenna terminals LA and LB. Inverter 76 has an input connected to one of antenna terminals to receive a single-ended signal. Outputs of differential amplifier circuit 71 and inverter circuit 72 are provided to multiplexer 73. A configuration value stored in NVM 54 is used by digital control circuit 55 to provide control signal CLKREC_EN_DIF_DET to select which output of differential amplifier circuit 71 or inverter circuit 72 to provide as clock recovery signal CLKREC. Note that signal CLKREC_EN may be delayed by one clock cycle by a delay circuit of clock recovery enable circuit 57 when enabled by CLKREC_MOD_DLY. In one embodiment, in order to use the additional few nanosecond delay provided by delay circuit 80 as described above regarding FIG. 4, inverter circuit 72 is selected. One embodiment of delay circuit 80 is illustrated in more detail in FIG. 7.

Figure 7:
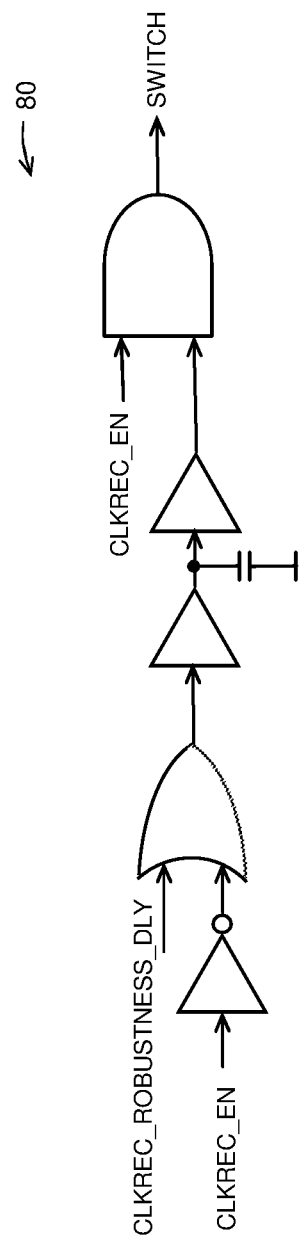
FIG. 7 illustrates the delay circuit of the clock recovery generator of FIG. 6 in more detail.

FIG. 7 illustrates the delay circuit 80 of the clock recovery generator of FIG. 6 in more detail. Delay circuit 80 receives control signal CLKREC_ROBUSTNESS_DLY from digital control 55, clock recovery enable signal CLKREC_EN, and delay circuit 80 provides an output labeled "SWITCH" to control terminals of switches 78 and 79. Delay circuit 80 is constructed with additional delay added to signal CLKREC_EN to compensate for PLL drift to improve synchronization between PLL clock and clock recovery signal CLKREC that occurred during the free running time between times 23 and 24 as shown in FIG. 4 when clock recovery signal CLKREC was low. In the illustrated embodiment, the delay provided by delay circuit 80 is about a few nanoseconds. In another embodiment, the delay can be different.

Figure 8:
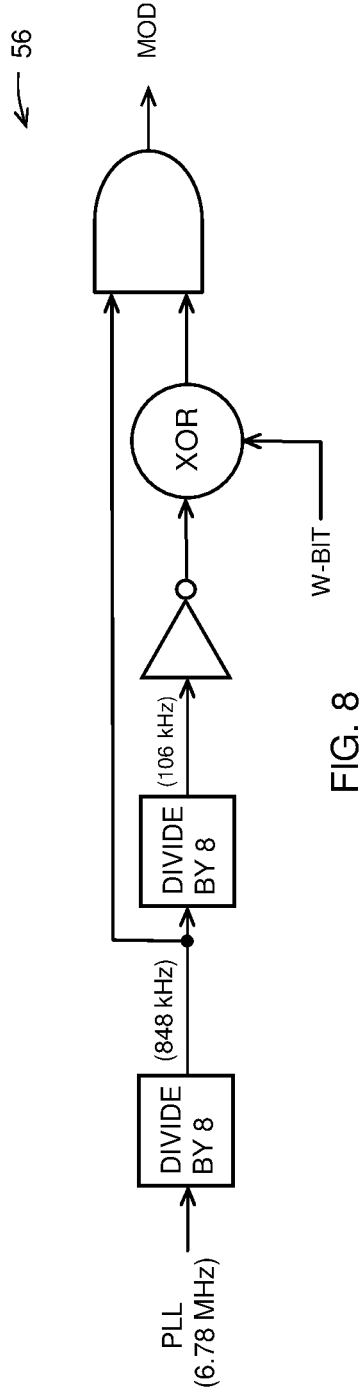
FIG. 8 illustrates the modulation envelope generator of the RFID tag of FIG. 5 in more detail.

FIG. 8 illustrates modulation envelope generator 56 of the RFID tag of FIG. 5 in more detail. Modulation envelope generator 56 includes two divide-by-8 circuits connected in series, an inverter, an exclusive OR (XOR) logic gate, and an AND logic gate. Modulation envelope generator 56 receives clock PLL and a bit labelled W_BIT. In one embodiment, the W-bit is provided as a logic "0" to mark the start of frame (SOF) and end of frame (EOF) of a transmitted frame, otherwise the W-bit is as per the data bits, a logic "0" or "1". Modulation envelope generator 56 provides modulation envelope signal MOD to control the beginning of clock recovery as shown FIG. 3 and FIG. 4. In one embodiment, modulation envelope signal MOD is generated as per International Organization for Standardization (ISO) protocol requirement ISO/IEC 14443.

Figure 9:
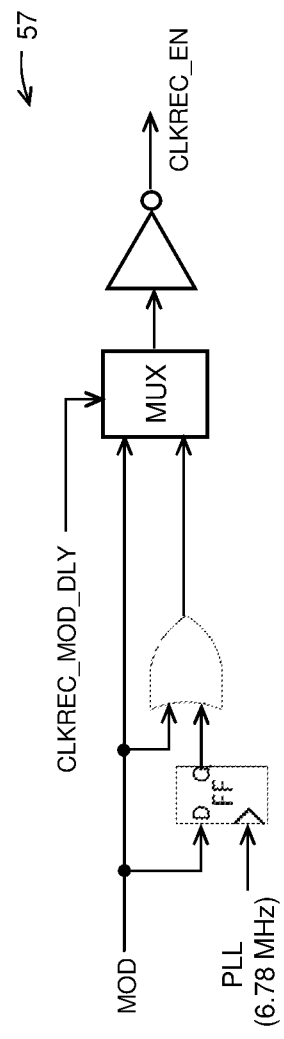
FIG. 9 illustrates the circuit generating a one-clock cycle delay of the RFID tag of FIG. 5 in more detail.

FIG. 9 illustrates the clock recovery enable circuit 57 of RFID tag 50 of FIG. 5 in more detail. Clock recovery circuit 57 includes a selectable delay circuit including a flip-flop, an OR logic gate, a multiplexer, and an inverter. Clock recovery enable circuit 57 receives modulation envelope signal MOD and clock PLL, and generates clock recovery enable signal CLKREC_EN. Clock recovery enable circuit 57 causes the rising edge of clock recovery signal CLKREC_EN to be delayed, or stretched, about one clock cycle as shown in FIG. 4. In the illustrated embodiment, the delay provided by the delay circuit of clock recovery enable circuit 57 is about the same as one cycle of a 6.78 MHZ clock which is one-half the RF FIELD frequency of 13.56 MHz. In another embodiment, the delay can be more than one clock cycle.

Figure 10:
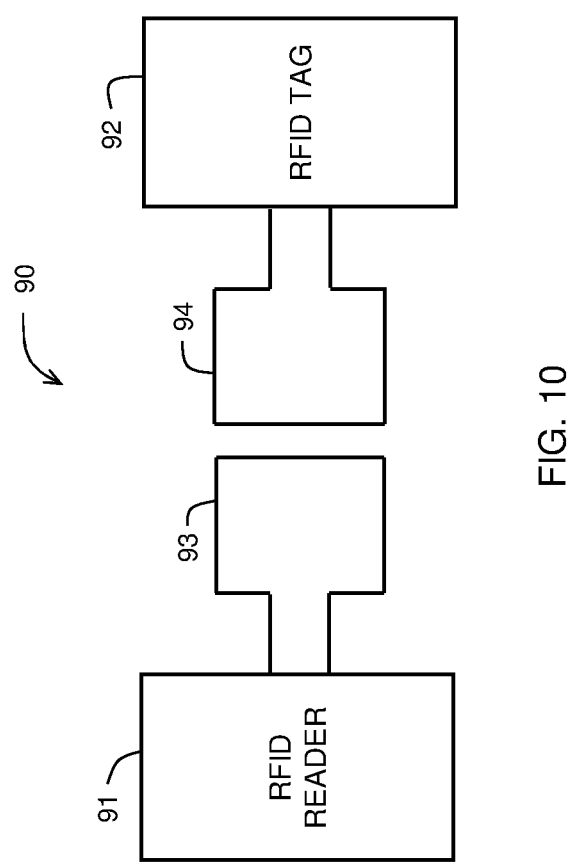
FIG. 10 illustrates a simplified view of a RFID system including the RFID tag of FIG. 5 in accordance with an embodiment.

FIG. 10 illustrates a simplified view of a RFID system 90 including RFID reader 91 and RIFD tag 92. RFID tag 92 may be implemented using RFID tag 50 of FIG. 5 in accordance with an embodiment. There can be one or more than one RFID tags in RFID system 90. An antenna 92 is coupled to RFID reader 91 and an antenna 94 is coupled to RFID tag 92. An RFID system may be used in various applications such as retail, supply chain management, shipping services, airline luggage tracking, laundry services, etc. In one embodiment, RFID tag 92 may be associated with one or more objects. Antenna 94 of RFID tag 92 receives an RF field from antenna 91 of RFID reader 91. Incoming energy from RFID reader 91 is used to power RFID tag 92 and provide communications in accordance with a protocol. Transmission may be by load modulation.

Figure 11:
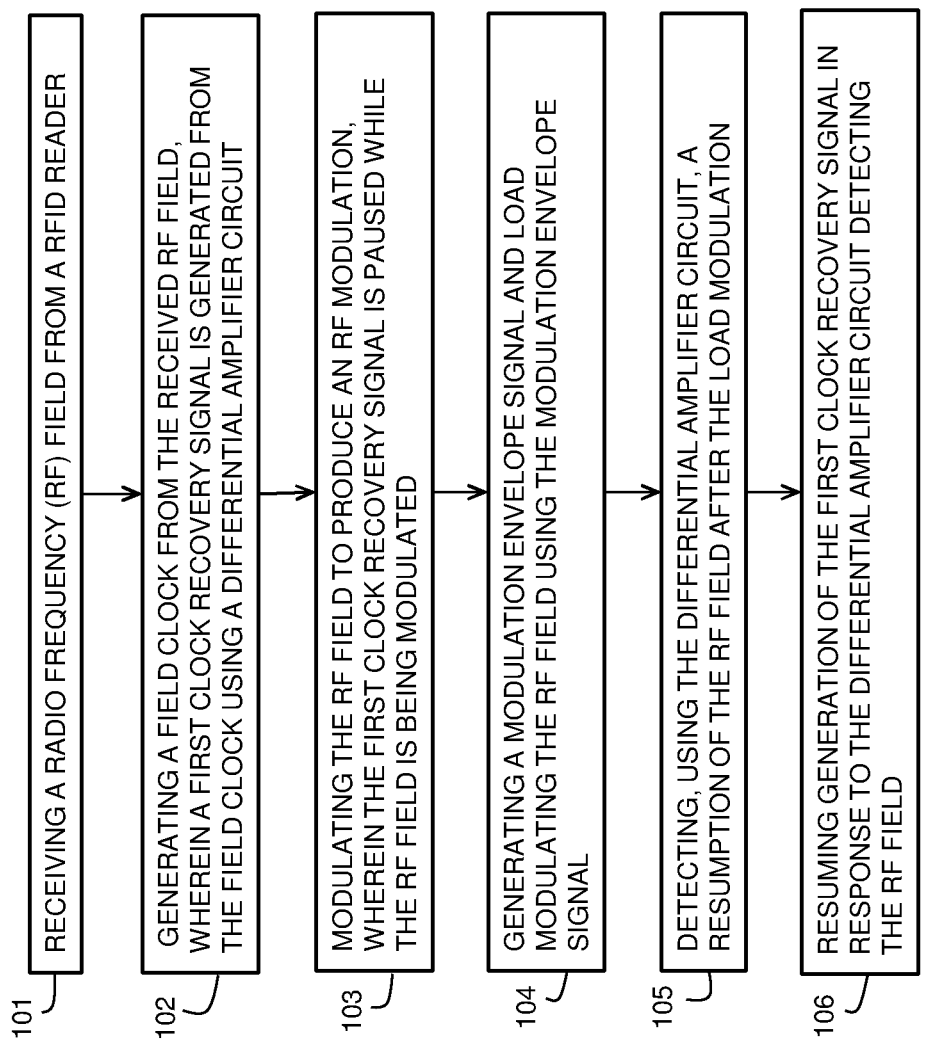
FIG. 11 illustrates a flowchart of a method for clock recovery in an RFID tag in accordance with an embodiment.

FIG. 11 illustrates a flowchart of method 100 for clock recovery in an RFID tag in accordance with the embodiment of FIG. 3. Method 100 begins at block 101. At block 101, a RF field is received from a RFID reader. At block 102, a field clock is generated from the received RF field, wherein a first clock recovery signal is generated from the field clock using a differential amplifier circuit. At block 103, the RF field is modulated to produce an RF modulation, wherein the first clock recovery signal is paused while the RF field is being modulated. At block 104, a modulation envelope signal is generated, and the RF field is load modulated using the modulation envelope signal. At block 105, the differential amplifier is used to detect resumption of the RF field after the load modulation. At step 106, generation of the first clock recovery signal is resumed in response to the RF field being detected after the load modulation.

Figure 12:
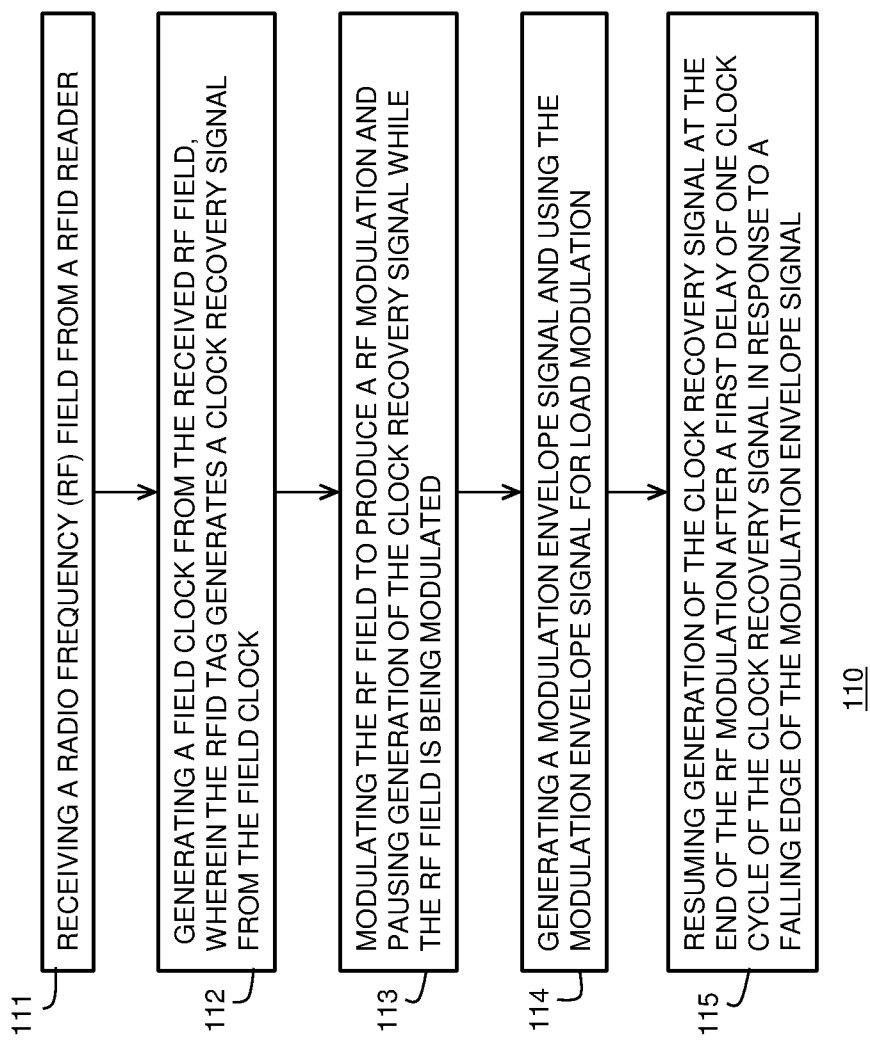
FIG. 12 illustrates a flowchart of a method for clock recovery in an RFID tag in accordance with an embodiment.

FIG. 12 illustrates a flowchart of method 110 for clock recovery in an RFID tag in accordance with the embodiment of FIG. 4. Method 110 begins at block 111. At block 111, a RF field is received from a RFID reader. At block 112, a field clock is generated from the received RF field, wherein the RFID tag generates a clock recovery signal from the field clock. At block 113, the RF field is modulated to produce a RF modulation and generation of the clock recovery signal is paused while the RF field is being modulated. At block 114, a modulation envelope signal is generated and used for load modulation. At block 115, generation of the clock recovery signal is resumed at the end of the RF modulation after a first delay of one clock cycle of the clock recovery signal in response to a falling edge of the modulation envelope signal.

Various embodiments, or portions of the embodiments, may be implemented in hardware or as instructions on a non-transitory machine-readable storage medium including any mechanism for storing information in a form readable by a machine, such as a personal computer, laptop computer, file server, smart phone, or other computing device. The non-transitory machine-readable storage medium may include volatile and non-volatile memories such as read only memory (ROM), random access memory (RAM), magnetic disk storage media, optical storage medium, flash memory, and the like. The non-transitory machine-readable storage medium excludes transitory signals.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements. The term "coupled," as used herein, is not intended to be limited to a direct coupling or a mechanical coupling.

What is claimed is:

1. A method for clock recovery in a radio frequency identification (RFID) tag, the method comprising:
    receiving a radio frequency (RF) field from a RFID reader;
    generating a field clock from the received RF field, wherein the RFID tag generates a clock recovery signal from the field clock;
    modulating the RF field to produce a RF modulation and pausing generation of the clock recovery signal while the RF field is being modulated;
    generating a modulation envelope signal and using the modulation envelope signal for load modulation; and
    resuming generation of the clock recovery signal at the end of the RF modulation after a first delay of one clock cycle of the clock recovery signal in response to a falling edge of the modulation envelope signal.

2. The method of claim 1, further comprising generating a phase locked loop (PLL) clock to operate the RFID tag while the load modulation is being produced.

3. The method of claim 2, wherein the PLL is free running during the load modulation.

4. The method of claim 1, further comprising operating a phase locked loop (PLL) in synchronization with the clock recovery signal, wherein the PLL and the clock recovery signal are at one-half a frequency of the field clock.

5. The method of claim 1, further comprising providing an inverter circuit having an input coupled to a first antenna terminal, and an output coupled to provide the clock recovery signal.

6. The method of claim 5, wherein resuming generation of the clock recovery signal at the end of the RF modulation after the first delay of one clock cycle of the clock recovery signal from a falling edge of the modulation envelope signal further comprises delaying enablement of the inverter by a second delay in addition to the first delay.

7. The method of claim 5, further comprising:
    providing a differential amplifier circuit having a first input coupled to the first antenna terminal, a second input coupled to a second antenna terminal, and an output; and
    coupling the output of the differential amplifier circuit to a first input of a multiplexer, coupling the output of the inverter circuit to a second terminal of the multiplexer, wherein in response to a selection signal, an output of the multiplexer providing the clock recovery signal using one of the differential amplifier circuit and the inverter circuit.

8. The method of claim 1, wherein resuming generation of the clock recovery signal at the end of the RF modulation after a first delay of one clock cycle of the clock recovery signal from a falling edge of the modulation envelope signal further comprises adding a second delay to the resuming generating of the clock recovery signal.

9. The method of claim 8, wherein adding the second delay further comprises adding one or more gate delays.

10. An integrated circuit (IC) comprising:
    a modulation envelope generator for receiving a phase-locked loop (PLL) clock and for generating a modulation envelope signal for load modulation;
    a clock recovery generator, comprising:
        a differential amplifier circuit having first and second inputs coupled to first and second antenna terminals, and an output;
        an inverter circuit having an input coupled to one of the first and second antenna terminals, and an output;
        a multiplexer having a first input coupled to the output of the differential amplifier, a second input coupled to the output of the inverter circuit, and an output coupled to provide a clock recovery signal generated using one of the differential amplifier circuit and the inverter circuit in response to a selection signal; and
    a clock recovery enable circuit coupled to receive the PLL clock and the modulation envelope signal, and an output coupled to delay enablement of the inverter circuit one clock cycle after resumption of a radio frequency (RF) field clock after the load modulation.

11. The IC of claim 10 further comprising a memory for storing configuration settings for a radio frequency identification (RFID) tag.

12. The IC of claim 10, wherein the modulation envelope generator controls a beginning and an ending of a load modulation period of the RFID tag.

13. The IC of claim 10, wherein the clock recovery generator further comprises a delay circuit comprising one of more gates for providing an additional delay to the enablement of the inverter circuit.

14. The IC of claim 10, wherein the inverter circuit further comprises a divide by two circuit coupled to the output of the inverter circuit, and the differential amplifier circuit further comprises a divide by two circuit coupled to the output of the differential amplifier.

15. The IC of claim 10 further comprising a phase locked loop (PLL) coupled to provide a clock signal when the clock recovery signal is not available during the load modulation.

16. A method for clock recovery in a radio frequency identification (RFID) tag, the method comprising:
    receiving a radio frequency (RF) field from a RFID reader;
    generating a field clock from the received RF field, wherein a first clock recovery signal is generated from the field clock using a differential amplifier circuit;
    modulating the RF field to produce an RF modulation, wherein the first clock recovery signal is paused while the RF field is being modulated;
    generating a modulation envelope signal and load modulating the RF field using the modulation envelope signal;
    detecting, using the differential amplifier circuit, a resumption of the RF field after the load modulation; and
    resuming generation of the first clock recovery signal in response to the differential amplifier circuit detecting the RF field.

17. The method of claim 16 further comprising generating a phase locked loop (PLL) clock to operate the RFID tag while the RF field is being load modulated.

18. The method of claim 16 further comprising:
    providing an inverter circuit having an input coupled to a first antenna terminal, and an output for providing a second clock recovery signal; and
    selecting one of the first clock recovery signal or the second clock recovery signal to operate the RFID tag.

19. The method of claim 18, further comprising adding a delay of one clock cycle to the second clock recovery signal.

20. The method of claim 18, wherein the method is performed in an integrated circuit of the RFID tag.

* * * * *